United States Patent
Barry et al.

(10) Patent No.: US 9,537,804 B2
(45) Date of Patent: *Jan. 3, 2017

(54) SYSTEM FOR DELEGATING THE PRIORITIZATION OF INCOMING COMMUNICATIONS TO TRUSTED USERS

(71) Applicant: International Business Machines Corporation, Armonk, NY (US)

(72) Inventors: Paul M. J. Barry, Cork (IE); William Duchenay, Cork (IE); Martin Fitzgerald, Cork (IE); John P. McAleer, Cork (IE)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/520,584

(22) Filed: Oct. 22, 2014

(65) Prior Publication Data

US 2016/0119781 A1    Apr. 28, 2016

(51) Int. Cl.
   *G06F 21/00* (2013.01)
   *H04L 12/58* (2006.01)
   *H04L 29/06* (2006.01)
   *H04W 12/02* (2009.01)

(52) U.S. Cl.
   CPC .............. *H04L 51/12* (2013.01); *H04L 51/02* (2013.01); *H04L 63/0876* (2013.01); *H04L 63/105* (2013.01); *H04L 63/123* (2013.01); *H04W 12/02* (2013.01)

(58) Field of Classification Search
   CPC ... H04W 12/02; H04L 63/123; H04L 63/0876; H04L 63/105; H04L 51/02; H04L 51/12
   See application file for complete search history.

(56) References Cited

U.S. PATENT DOCUMENTS

| | | |
|---|---|---|
| 6,581,075 B1 | 6/2003 | Guturu et al. |
| 7,499,529 B1 | 3/2009 | Kvache et al. |
| 7,577,984 B2 | 8/2009 | Levin et al. |
| 8,090,088 B2 | 1/2012 | Mullis et al. |
| 8,315,595 B2 | 11/2012 | Murphy et al. |

(Continued)

FOREIGN PATENT DOCUMENTS

| | | |
|---|---|---|
| GB | 2456742 A | 7/2009 |
| GB | 2491165 A | 11/2012 |

(Continued)

OTHER PUBLICATIONS

"Method and System for Prioritizing Notification of Messages by Assigning a Level of Importance to Senders of the Messages". IP.com Prior Art Database Technical Disclosure. IP.com No. IPCOM000199971D. IP.com Electronic Publication: Sep. 22, 2010.

(Continued)

*Primary Examiner* — Kendall Dolly
(74) *Attorney, Agent, or Firm* — David B. Woycechowsky; John W. Hayes

(57) ABSTRACT

A computer-implemented method for prioritizing an incoming communication directed to a recipient by an originator includes creating a privacy/trust relationship between a recipient and an originator in response to user input, and determining a disposition of an incoming communication by reference to the privacy/trust relationship.

4 Claims, 3 Drawing Sheets

(56) References Cited

U.S. PATENT DOCUMENTS

| | | | |
|---|---|---|---|
| 8,416,933 | B2 | 4/2013 | Hartley et al. |
| 8,428,244 | B2 | 4/2013 | Chen et al. |
| 2007/0111702 | A1 | 5/2007 | Sanzelius et al. |
| 2009/0013269 | A1 | 1/2009 | Khandpur |
| 2009/0125601 | A1* | 5/2009 | Braam .................. G06Q 10/107 709/207 |
| 2010/0319063 | A1 | 12/2010 | Koppolu et al. |
| 2012/0185547 | A1* | 7/2012 | Hugg ...................... H04L 51/20 709/206 |
| 2012/0219132 | A1* | 8/2012 | Burchard .......... H04M 3/42042 379/142.04 |
| 2013/0148790 | A1 | 6/2013 | McGary et al. |
| 2013/0305318 | A1* | 11/2013 | DeLuca .................. G06F 21/00 726/4 |

FOREIGN PATENT DOCUMENTS

| | | |
|---|---|---|
| JP | 2003248647 A | 9/2003 |
| JP | 4257042 B2 | 4/2009 |
| JP | 2009163371 A | 7/2009 |
| JP | 2011097516 A | 5/2011 |
| JP | 4896342 B2 | 3/2012 |
| JP | 5025649 B2 | 9/2012 |
| JP | 2012182601 A | 9/2012 |
| JP | 5112479 B2 | 1/2013 |
| JP | 2013512525 A | 4/2013 |
| WO | 0108431 A1 | 2/2001 |
| WO | 2012160384 A1 | 11/2012 |

OTHER PUBLICATIONS

"System and Method for Mail Content and Exchange Sequence Analyzer to Determine User's Recipient Level". IP.com Prior Art Database Technical Disclosure. IP.com No. IPCOM000222891D. IP.com Electronic Publication: Oct. 29, 2012.

Barry et al., "System for Delegating the Prioritization of Incoming Communications to Trusted Users", U.S. Appl. No. 14/856,744, filed Sep. 17, 2015.

Appendix P—List of IBM Patents or Patent Applications Treated as Related.

* cited by examiner

SYSTEM FOR DELEGATING THE PRIORITIZATION OF INCOMING COMMUNICATIONS TO TRUSTED USERS

BACKGROUND OF THE INVENTION

The present invention relates generally to the field of communications and more particularly to prioritizing communications based on a relationship between a recipient's privacy status and an originator's trust level, the prioritization delegated to the trusted originator.

The proliferation of communications devices and the overlap of work and personal life makes it difficult to prioritize incoming communications. Often, the volume of incoming communications can overwhelm the recipient, making it difficult and time consuming for them to distinguish between trivial or unimportant messages and important ones. With regard to incoming telephone communications, the recipient may be inundated with phone calls, some important and others not. Similar difficulties can arise with respect to email messages, SMS messages and others types of person-to-person communications wherein the recipient may be inundated with incoming communications with no way to screen out unimportant messages while allowing others to come through.

SUMMARY

Embodiments in accordance with the present invention disclose a method, computer program product, and system for prioritizing an incoming communication directed to a recipient by an originator. The computer-implemented method includes creating a privacy/trust relationship between a recipient and an originator in response to user input, and determining a disposition of an incoming communication by reference to the privacy/trust relationship.

DETAILED DESCRIPTION

Figure 1:
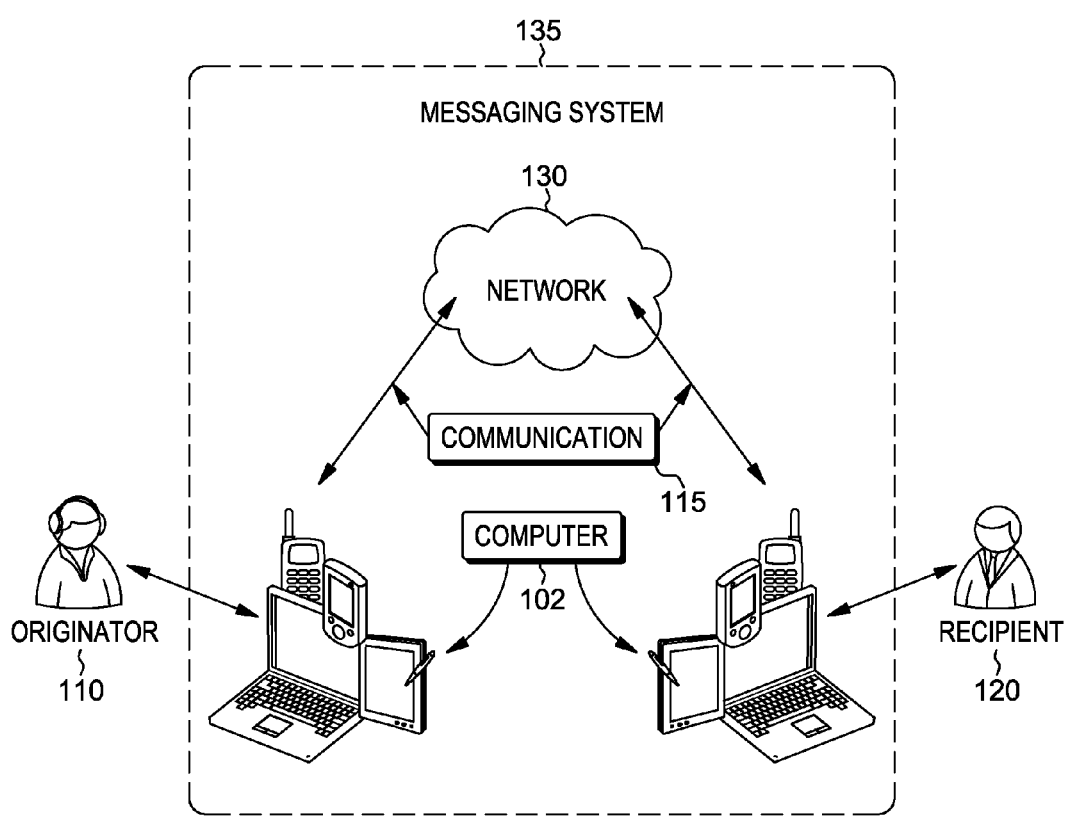
FIG. 1 is a depiction of a networked communications environment, generally designated with numeral 100, in which embodiments in accordance with the present invention can operate.

In embodiments in accordance with the present invention, one or more privacy levels are established for a recipient. The privacy levels represent increasingly more restrictive filters, which govern who may contact the recipient. The recipient can set a privacy status by activating a privacy level selected from the established levels. The recipient can also choose not to set a privacy status, or to deactivate an existing one, and thereby have no filtering in place.

In conjunction with the privacy levels, one or more trust levels are established. Trust levels can be assigned to any number of originators selected by the recipient. The trust levels represent increasingly more permissive credentials, enabling a trusted individual to traverse the privacy filter, and make contact with the recipient, under certain circumstances as dictated by the privacy/trust relationship existing at the time of the attempted communication.

An originator, who is assigned a trust level by a recipient, becomes a trusted originator with respect to the recipient. A trusted originator may have the ability to override a recipient's privacy level in at least some circumstances. An originator who has not been assigned a trust level is a non-trusted originator with respect to the recipient. A non-trusted originator may not be able to override the recipient's privacy status, regardless of the circumstances, and may reach the recipient when the recipient has no privacy status in effect.

If a recipient does not activate a privacy status, incoming communications may be handled in normal fashion, i.e. neither blocked, deferred nor otherwise impeded by aspects of embodiments in accordance with the present invention. If a recipient's privacy status is in effect, an attempted communication from a non-trusted originator may be deferred or blocked.

If a recipient's privacy status is in effect, an attempted communication from a trusted originator having a trust level insufficient to override the recipient's privacy status may be blocked, whereas if the trusted originator has been assigned a trust level sufficient to override the recipient's privacy status, the communication may be put into a pending status, the originator informed of the recipient's privacy status and prompted to indicate a choice selected from a set of options that may include for example: 1) To override the privacy status and thereby permit the communication to go through; 2) Not to override the privacy status and thereby causing the communication to be blocked, or 3) To abandon the communication. The communication is handled in accordance with user input from the originator. The communication may be terminated or blocked if a response is not received from the originator within a predetermined time interval.

In another embodiment in accordance with the present invention, if a recipient's privacy status is in effect, an attempted communication from a trusted originator who has been assigned a trust level sufficient to override the recipient's privacy status may be handled in the normal fashion, i.e. neither blocked, deferred nor otherwise impeded by aspects of embodiments in accordance with the present invention.

An advantage provided by embodiments in accordance with the present invention is that incoming communications from non-trusted originators can be blocked, while communications from trusted originators with a trust level sufficiently high to override the recipient's privacy level, can get through, either directly, or in response to user input from the originator.

Examples of ways that various types of communications can be deferred or blocked include: 1) Telephone calls and video calls may be directed to an alternate destination, such as to voice-mail, the originator may receive a busy signal or a message indicating the recipient is not currently accepting calls; 2) Text messages and instant messages may be refused by the recipient's communication device, or they may be queued and later delivered in response to a lowering or cancellation of the recipient's privacy status; 3) An email may be routed to a specified folder intended to receive emails blocked by aspects of embodiments in accordance with the present invention. The foregoing examples should be construed neither as limitations upon, nor as the only methods available for blocking communications in embodiments in accordance with the present invention.

Example embodiments in accordance with the present invention will now be described in detail with reference to the drawing figures. FIG. 1 is a depiction of a networked communications environment, generally designated with numeral 100, in which embodiments in accordance with the present invention can operate.

Computer 102 can be any communication device as implemented in embodiments in accordance with the present invention. Computer 102 can be for example, a laptop, desktop or tablet computer, a cell phone, a smartphone, a personal digital assistant, etc. References throughout this disclosure to computer 102 shall be construed as applying to whichever communication device is utilized in the referencing context.

An originator 110 may use computer 102 to communicate with recipient 120, via network 130. Communication 115 may be, for example, a phone call, a text message, an e-mail, etc.

Network 130 can be, for example, a local area network (LAN), a wide area network (WAN) such as the Internet, a cellular phone network, or any combination of the foregoing. Network 130 can comprise any combination of wired, wireless, or fiber optic connections. In general, network 130 can be any combination of connections and transmission protocols that supports communication 115, between originator 110 and recipient 120.

Without regard to the types of computer 102 used or the nature of network 130, the infrastructure that conveys communication 115 between originator 110 and recipient 120, including network 130 and computer 102 used by the originator and recipient, is defined herein as messaging system 135. Originator 110 and recipient 120 are individuals utilizing messaging system 135.

Figure 2:
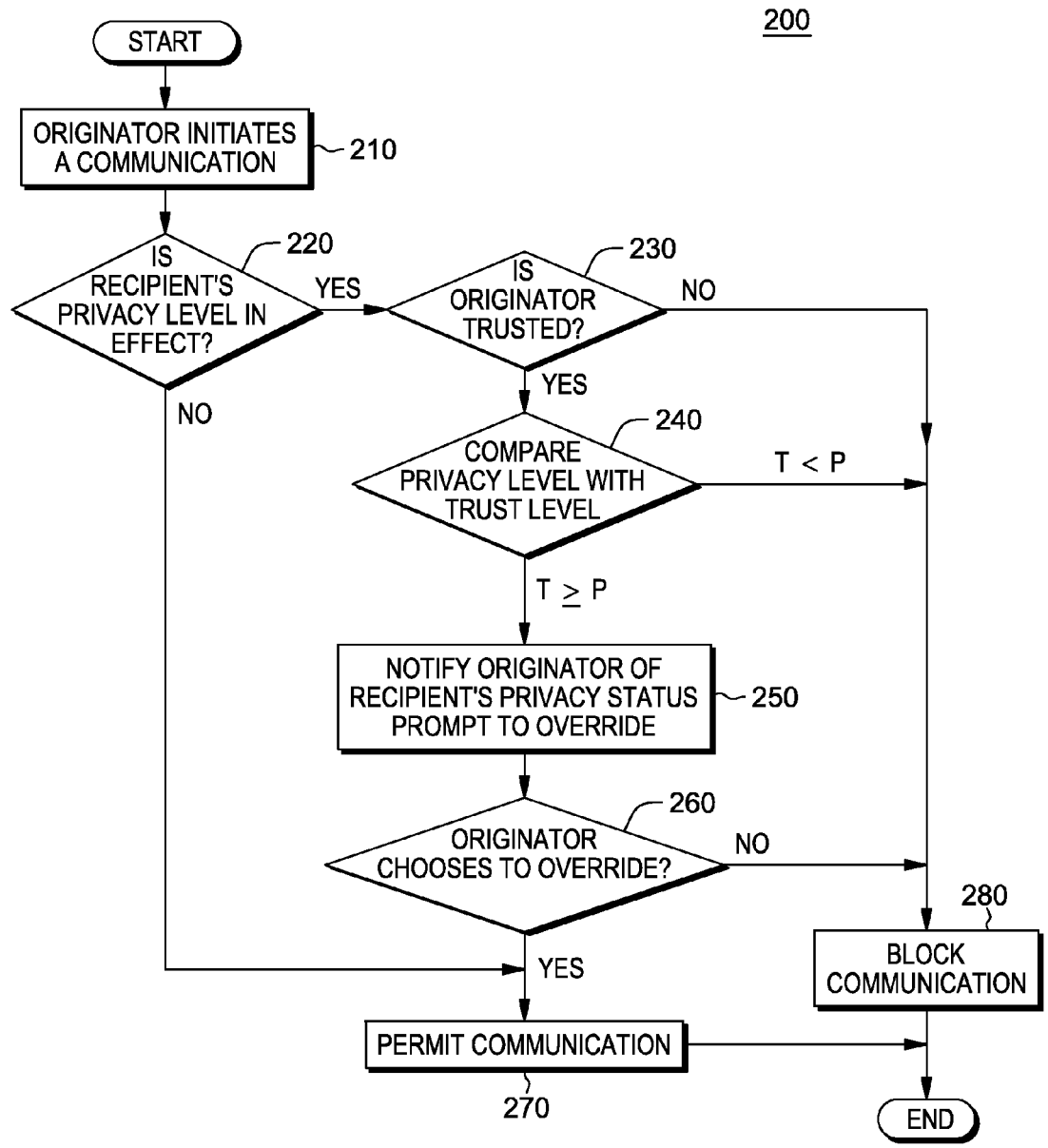
FIG. 2 is a flowchart, generally designated with numeral 200, depicting actions and decisions taken within messaging system 135 in at least one embodiment in accordance with the present invention.

FIG. 2 is a flowchart, generally designated with numeral 200, depicting actions and decisions taken within messaging system 135 in at least one embodiment in accordance with the present invention. Originator 110 initiates a communication 115 with recipient 120 (function block 210). If recipient 120 has no privacy status in effect (decision 220, "No" branch), communication 115 is allowed to connect with recipient 120 as normal, i.e. the communication is neither blocked, deferred nor otherwise impeded by aspects of embodiments in accordance with the present invention.

If recipient 120 has a privacy status in effect (decision 220, "Yes" branch), and originator 110 is not trusted (decision 230, "No" branch), or is trusted but with a trust level insufficient to override the privacy level (decision 240, "T<P" branch), communication 115 is blocked (function block 280).

If originator 110 is trusted (decision 230, "Yes" branch), an operation is conducted, comparing recipient 120's privacy status against originator 110's trust level (decision 240). If originator 110's trust level is sufficient relative to recipient 120's privacy status, (decision 240, "T≥P" branch), messaging system can send an indication of recipient 120's privacy level to originator 110, and originator is offered options comprising, essentially "override" or "do not override" recipient 120's privacy level (function block 250). Responsive to receiving user input from originator 110, if the user input indicates originator 110 chose to override the privacy level, (decision 260 "Yes" branch), the system determines that communication is permitted to go through (function block 270). If originator 110 chooses not to override communication 115 (decision 260, "No" branch), the system determines that the communication is blocked.

It is noted here, that criteria for determining whether a trust level is less than, equal to, or greater than a privacy level, are implementation aspects of embodiments in accordance with the present invention.

It is to be noted that in some embodiments in accordance with the present invention, a recipient may establish a trust/privacy relationship with respect to an originator's first phone number, and independently establish a different trust/privacy relationship with respect to the originator's second phone number, and still other trust/privacy relationships with respect to the originator's emails, short message service text messages, video calls, etc.

Figure 3:
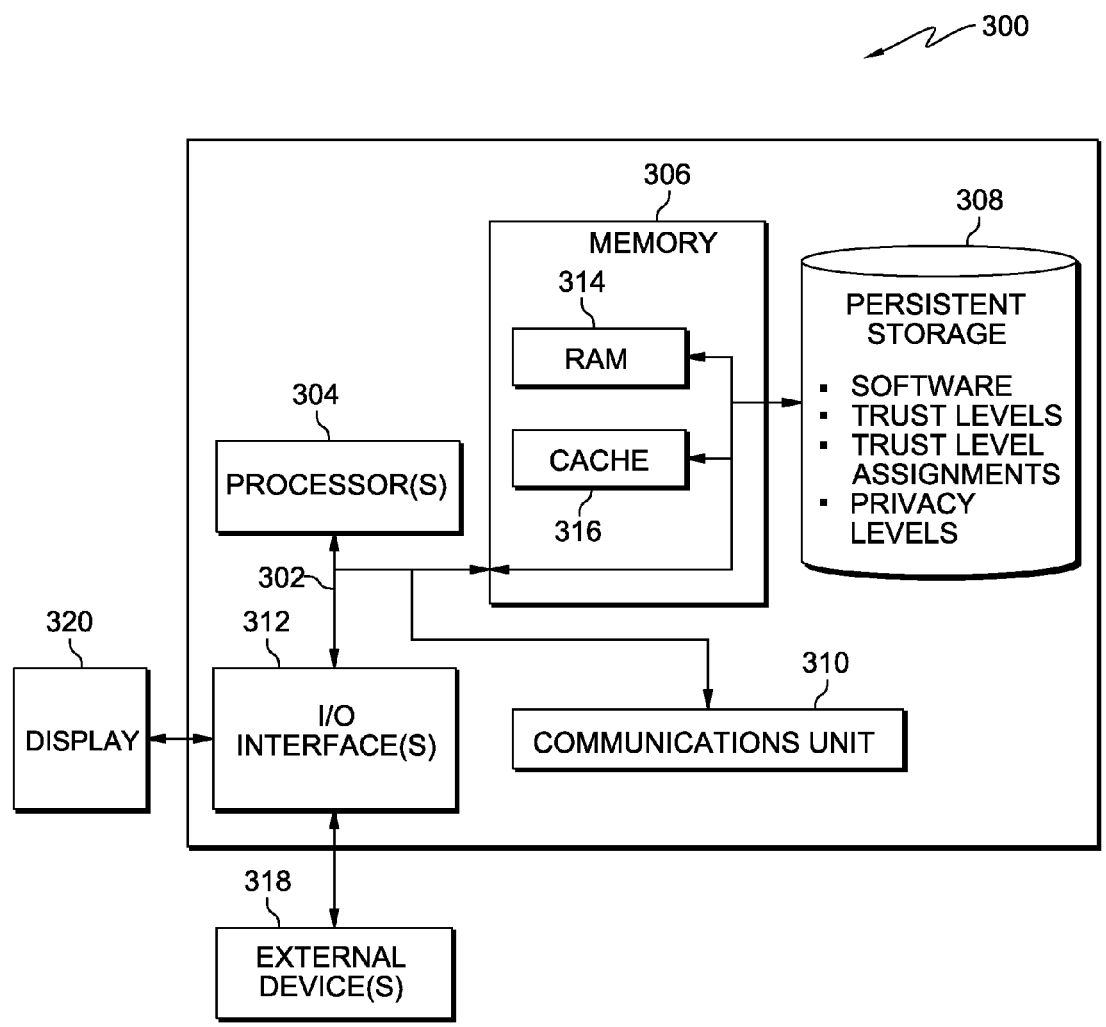
FIG. 3 is a block diagram, generally designated with numeral 300, depicting components of computer 102, in accordance with an illustrative embodiment of the present invention.

FIG. 3 is a block diagram, generally designated with numeral 300, depicting components of computer 102, in accordance with an illustrative embodiment of the present invention. It should be appreciated that FIG. 3 provides only an illustration of one implementation and does not imply any limitations with regard to the environments in which different embodiments may be implemented. Many modifications to the depicted environment may be made. For example, computer 102 may comprise components spread through multiple systems and resources and may provide systems and resources beyond what is necessary to operate embodiments of the present invention.

Computer 102 includes communications fabric 302, which provides communications between computer processor(s) 304, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer-readable storage media. In this embodiment, memory 306 includes random access memory (RAM) 314 and cache memory 316. In general, memory 306 can include any suitable volatile or non-volatile computer-readable storage medium.

Software and data are stored in persistent storage 308 for execution by one or more of computer processors 304 via one or more memories of memory 306. In this embodiment, persistent storage 308 includes a magnetic hard disk drive. Alternatively, or in addition to a magnetic hard disk drive, persistent storage 308 can include a solid state hard drive, a semiconductor storage device, read-only memory (ROM), erasable programmable read-only memory (EPROM), flash memory, or any other computer-readable storage medium that is capable of storing program instructions or digital information. Persistent storage 308 may include operating system software, and application software that manages communication in accordance with trust levels, trust level assignments, and privacy levels.

The media used by persistent storage 308 may also be removable. For example, a removable hard drive may be used for persistent storage 308. Other examples include optical and magnetic disks, thumb drives, and smart cards that are inserted into a drive for transfer onto another computer-readable storage medium that is also part of persistent storage 308.

Communications unit 310, in these examples, provides for communications with other data processing systems or devices, including systems and devices within or controlled by computer 102. In these examples, communications unit 310 includes one or more wireless network interface cards. Communications unit 310 may provide communications through the use of either or both physical and wireless communications links. Computer programs and processes, may be downloaded to persistent storage 308 through communications unit 310.

I/O interface(s) 312 allows for input and output of data with other devices that may be connected to computer 102. For example, I/O interface 312 may provide a connection to external devices 318 such as a keyboard, keypad, a touch screen, and/or some other suitable input device. External devices 318 can also include portable computer-readable storage media such as, for example, thumb drives, portable optical or magnetic disks, and memory cards. Software and data used to practice embodiments of the present invention can be stored on such portable computer-readable storage media and can be loaded onto persistent storage 308 via I/O interface(s) 312. I/O interface(s) 312 may also connect to a display 320.

Display 320 provides a mechanism to display data to a user and may be, for example, a touch screen or a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

To illustrate actions in at least one embodiment in accordance with the present invention, the following example scenarios are given:

Recipient 120 establishes three privacy levels: "1—Busy," "2—In a work meeting," and "3—Accepting emergency calls only." Recipient 120 establishes three trust levels corresponding respectively to the three privacy levels. Throughout the following example scenarios, originator 110 is trusted with respect to recipient 120 with regard to phone calls, and is assigned trust level "2."

Example 1

In one scenario, recipient 120 sets their privacy status to "2—In a work meeting." Originator 110 initiates a phone call directed to recipient 120. Because originator 110's trust level is at least equal to recipient's privacy status, the messaging system informs originator 110 of recipient 120's privacy status, and prompts originator 110 to choose from among two or more options including: a) "Complete the call" and b) "Connect with recipient 120's voice-mail." Originator 110 decides the matter is not important enough to interrupt a work meeting and chooses to leave a voice-mail. Originator 110 could also have merely chosen to abandon the call by merely hanging up the phone without responding to the options presented.

Example 2

In another scenario, recipient 120 has activated a privacy status of "2—In a work meeting." Originator 110 attempts to call recipient 120, to discuss an urgent business matter that directly affects recipient 120 as is relevant to the subject being discussed in the meeting. Originator 110 is informed of recipient 120's privacy status and is given the same options as before. Originator 110 decides to complete the call and is connected with recipient 120.

Example 3

In yet another scenario, recipient 120 has cancelled their privacy status. Originator 110 calls recipient 120 and is put through, without interference by aspects of embodiments in accordance with the present invention.

Example 4

In still another scenario, recipient 120 sets privacy status to "3—Accepting emergency calls only." Originator 110 attempts to call recipient 120 and the call is blocked, because originator 110's trust level is not sufficiently high to override recipient 120's privacy status.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product comprising:
  one, or more, computer readable tangible storage media; and
  program instructions stored on at least one of the one, or more, computer readable tangible storage media, the program instructions comprising:
    program instructions programmed to assign, by a recipient user, a trust level to each contact of a plurality of contacts, including a first contact,
    program instructions programmed to, in response to user input from the recipient user, set a privacy level setting on a telephone device of a recipient user,
    program instructions programmed to, responsive to an attempted telephone call by a telephone device of the first contact to the telephone device of the recipient user, determine whether the trust level assigned to the first contact is equal to or greater than the privacy level set by the recipient user,
    program instructions programmed to, on condition that the assigned trust level of the first contact is greater than or equal to the privacy level set by the recipient user, communicate the privacy level setting on the telephone device of the recipient user to the telephone device of the first contact, and
    program instructions programmed to, on condition that the first contact indicates that the attempted telephone call should proceed and on further condition that the trust level of the first contact is greater than or equal to the privacy level, causing the telephone device of the recipient user to make an indication of an incoming call or on condition that the trust level of the first contact is less than the privacy level, handling the attempted telephone call by blocking or deferring the telephone call.

2. The computer program product in accordance with claim 1, wherein the program instructions further comprise:
  program instructions to communicate, from the recipient user to the device of the first contact, a set of options including at least the following options:
  complete the attempted telephone call; and
  connect to a voice mail answering service associated with the recipient user.

3. A computer system comprising:
  one, or more, computer readable storage media; and
  program instructions stored on at least one of the one, or more, computer readable storage media, the program instructions comprising:
    program instructions programmed to assign, by a recipient user, a trust level to each contact of a plurality of contacts, including a first contact, program instructions programmed to, in response to user input from the recipient user, set a privacy level setting on a telephone device of a recipient user, program instructions programmed to, responsive to an attempted telephone call by a telephone device of the first contact to the telephone device of the recipient user, determine whether the trust level assigned to the first contact is equal to or greater than the privacy level set by the recipient user, program instructions programmed to, on condition that the assigned trust level of the first contact is greater than or equal to the privacy level set by the recipient user, communicate the privacy level setting on the telephone device of the recipient user to the telephone device of the first contact, and program instructions programmed to, on condition that the first contact indicates that the attempted telephone call should proceed and on further condition that the trust level of the first contact is greater than or equal to the privacy level, causing the telephone device of the recipient user to make an indication of an incoming call or on condition that the trust level of the first contact is less than the privacy level, handling the attempted telephone call by blocking or deferring the telephone call.

4. The computer system in accordance with claim 3, wherein the program instructions further comprise:
program instructions to communicate, from the recipient user to the device of the first contact, a set of options including at least the following options:
complete the attempted telephone call; and
connect to a voice mail answering service associated with the recipient user.

* * * * *